US012682600B2

(12) United States Patent
Ha et al.

(10) Patent No.: US 12,682,600 B2
(45) Date of Patent: Jul. 14, 2026

(54) CLOTHING DESIGN SIMILARITY DETERMINATION SYSTEM AND METHOD

(71) Applicant: D3D Co., Ltd., Seoul (KR)

(72) Inventors: Ji-Tae Ha, Busan (KR); Eun-Mi Oh, Seoul (KR); Hyo-Jung Chang, Seongnam-si (KR); Jo-Woon Chong, Seoul (KR)

(73) Assignee: D3D CO., LTD., Seoul (KR)

( * ) Notice: Subject to any disclaimer, the term of this patent is extended or adjusted under 35 U.S.C. 154(b) by 273 days.

(21) Appl. No.: 18/400,566

(22) Filed: Dec. 29, 2023

(65) Prior Publication Data

US 2025/0218154 A1    Jul. 3, 2025

(30) Foreign Application Priority Data

Dec. 27, 2023    (KR) ........................ 10-2023-0192996

(51) Int. Cl.
| | |
|---|---|
| *G06K 9/46* | (2006.01) |
| *G06V 10/26* | (2022.01) |
| *G06V 10/75* | (2022.01) |

(52) U.S. Cl.
CPC .......... *G06V 10/757* (2022.01); *G06V 10/273* (2022.01)

(58) Field of Classification Search
CPC .. G06V 10/757; G06V 10/273; G06V 10/761; G06V 10/82
See application file for complete search history.

(56) References Cited

FOREIGN PATENT DOCUMENTS

| | | | | |
|---|---|---|---|---|
| CN | 108197180 A | * | 6/2018 | ........... G06V 10/757 |
| CN | 108229496 A | * | 6/2018 | ............... G06N 3/08 |
| CN | 113449563 A | * | 9/2021 | ......... G06F 16/5866 |
| KR | 10-2016-0120238 | | 10/2016 | |
| KR | 20220135227 A | * | 10/2022 | ............. G06Q 50/10 |

* cited by examiner

*Primary Examiner* — Xin Jia
(74) *Attorney, Agent, or Firm* — KILE PARK REED & HOUTTEMAN PLLC

(57) ABSTRACT

A clothing design similarity determination system and method are provided. The clothing design similarity determination method includes: a first step (S100) of collecting image data about clothing using a device (1); a second step (S110) of removing unnecessary parts from the collected image data using a pre-processing unit; a third step (S120) of image-processing features of the clothing by calculating an extracted target image using a feature calculation unit (9); a fourth step (S130) of storing the data of the first, second, and third steps (S100, S110, S120) in a database (13); and a fifth step (S140) of calculating similarity of clothing design using artificial intelligence.

This work was supported by project for Smart Manufacturing Innovation R&D funded Korea Ministry of SMEs and Startups in 2023. (Project No. RS-2022-00141433)

4 Claims, 11 Drawing Sheets

<u>9</u>

P

A

Original Image

Pre-Processed Image

Original Image                    Pre-Processed Image

Original Image                    Pre-Processed Image

Input Layer

Output Layer

Node

Artificial Neural Network

CLOTHING DESIGN SIMILARITY DETERMINATION SYSTEM AND METHOD

CROSS-REFERENCE TO RELATED APPLICATION

This application claims priority to and the benefit of Korean Patent Application No. 10-2023-0192996 filed in the Korean Intellectual Property Office on Dec. 27, 2023, the entire contents of which are incorporated herein by reference.

BACKGROUND

1. Field

The present disclosure relates to a clothing design similarity determination system and method, and more particularly, to a technology for pre-processing clothing image data obtained by a device, extracting clothing features, and then determining similarity between clothing images using artificial intelligence.

2. Description of the Related Art

Recently, as interest in fashion has increased, information about clothing has become increasingly available online.

Such online fashion information appears in various forms, such as posting and purchasing clothing on Internet homepages or exchanging fashion information through social network service (SNS).

In particular, system technology for ordering, manufacturing, and delivering clothing on the Internet is being developed.

However, fashion designers or fashion companies have difficulty in protecting and managing their designs in a rapidly accelerating market, especially since there is no copyright on clothes.

Under the Copyright Act, copyright is stipulated to arise from the time of creation. However, in reality, when a clothing fashion design is created, most people do not register the copyright. In this case, it is difficult to determine who owns the copyright on the clothing fashion design.

Furthermore, a major problem when designing creative and unique clothing in the fashion industry is using other people's designs as one's own or copying designs from famous brands.

In order to claim copyright, similarity between pieces of clothing has to be determined. However, there are limitations in similarity determination method.

CITATION LIST

Patent Literature

Korean Patent Application No. 10-2016-42307 (Title: CLOTHING RECOMMENDATION SYSTEM)

SUMMARY

The present disclosure has been made in consideration of the above-described conventional problems, and an object of the present disclosure is to provide a clothing design similarity determination system and method for pre-processing clothing image data obtained by a device, extracting clothing features, and then determining similarity between clothing images using artificial intelligence.

In order to achieve the above object, a clothing design similarity determination method according to an preferred embodiment of the present disclosure includes: a first step (S100) of collecting image data about clothing using a camera (1); a second step (S110) of removing unnecessary parts from the collected image data using a pre-processing unit; a third step (S120) of image-processing features of the clothing by calculating an extracted target image using a feature calculation unit (9); a fourth step (S130) of storing the data of the first, second, and third steps (S100, S110, S120) in a database (13); and a fifth step (S140) of calculating similarity of clothing design using artificial intelligence.

In accordance with another embodiment of the present disclosure, a clothing design similarity determination system includes: a device (1) configured to obtain and control clothing images; and a management server (3) configured to determine similarity by processing clothing design data transmitted from the device (1) through a network, wherein the management server (3) includes: an input unit (5) configured to receive clothing image data from the device (1); an image extraction unit (7) configured to extract target image data through pre-processing performed by removing unnecessary parts from the collected clothing image data; a feature calculation unit (9) configured to calculate features of clothing using an equation from the extracted target image data and process the calculated features into a curved shape; a similarity calculation unit (11) configured to calculate similarity of clothing data calculated in the feature calculation unit (9) with respect to other clothing designs using artificial intelligence; and a database (13) in which data is stored.

DETAILED DESCRIPTION OF THE EMBODIMENTS

Figure 1:
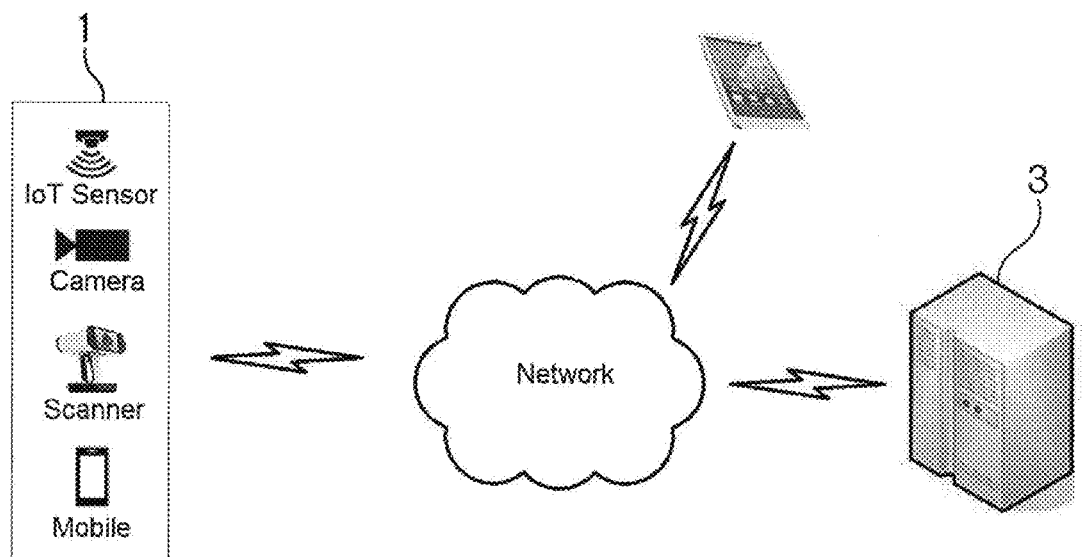
FIG. 1 is a diagram schematically illustrating a clothing design similarity determination system in accordance with an embodiment of the present disclosure.

Hereinafter, a clothing design similarity measurement method and system in accordance with an embodiment of the present disclosure will be described in detail with reference to the accompanying drawings.

As illustrated in FIGS. 1 to 8, the clothing design similarity measurement method proposed in the present disclosure includes: a first step S100 of collecting image data about clothing using a device 1, a second step S110 of performing pre-processing by removing unnecessary parts from the collected image data using an image extraction unit 9; a third step S120 of image-processing the features of the clothing by calculating an extracted target image using the feature calculation unit 9; a fourth step S130 of storing the data of the first, second, and third steps S100, S110, and S120 in a database 13; and a fifth step S140 of calculating similarity of clothing design using artificial intelligence.

In the clothing design similarity measurement method, an image may be collected by photographing clothing using the device 1 in the first step S100.

The device 1 may include various devices such as devices capable of obtaining images, for example, a camera, a three-dimensional (3D) camera, a scanner, and an Internet of things (IoT) sensor.

The collected clothing data is transmitted to the management server 3 through the network for pre-processing and similarity calculation.

In the second step S110, the pre-processing is performed to remove unnecessary parts from the image data transmitted to the management server 3 using the image extraction unit 7.

The process of removing unnecessary images in advance may be performed in various methods, for example, outlier detection, duplicate removal, quality evaluation, labeling error, and data balance maintenance.

The outlier detection method detects outliers using an algorithm for finding unusual patterns or outliers in an image data set. Unique images may be identified using statistical methods or machine learning models.

In the case of the duplicate removal method, when the same image is included in a duplicate manner, the duplicate image is identified and removed. A hash function is used to generate a unique hash of the image and the duplicate may be found through comparison.

In the case of the quality evaluation method, the quality of an image is evaluated and a low-quality image is removed. For example, images are evaluated based on resolution, brightness, color, etc. and low-quality images are removed.

Clothing images are pre-processed as described above. For example, clothing images may be processed as in images illustrated in FIGS. 4A, 5A, and 6A.

Figure 4A:
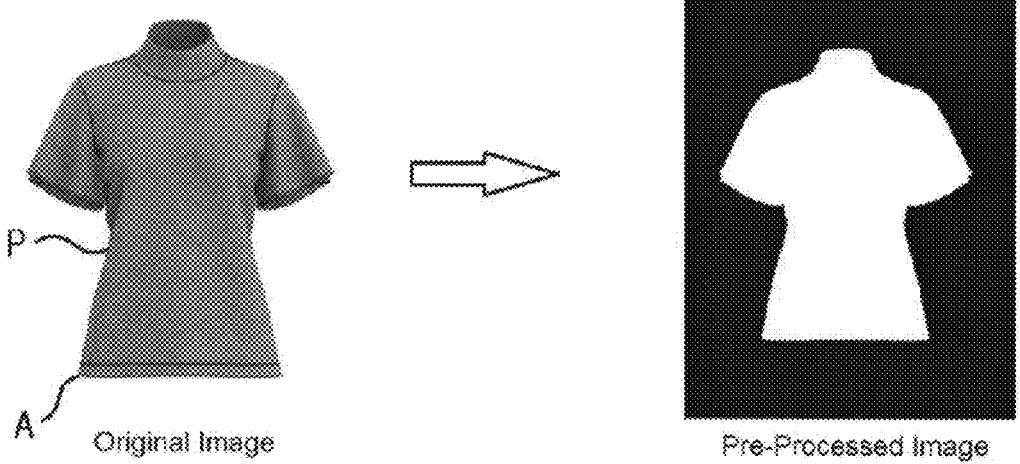
FIG. 4A is a diagram illustrating a clothing design similarity determination process for short-sleeved clothing and is a diagram illustrating pre-processing of a clothing image.

That is, as illustrated in FIG. 4A, an original image is obtained by scanning short-sleeved clothing. The original image is pre-processed into black and white through pre-processing such as binarization.

Figure 5A:
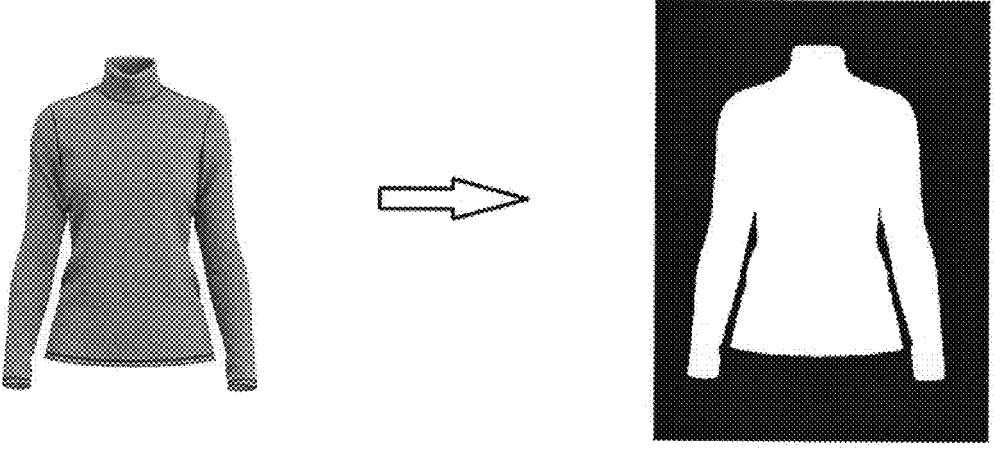
FIG. 5A is a diagram illustrating a clothing design similarity determination process for long-sleeved clothing and is a diagram illustrating pre-processing of a clothing image.

FIG. 5A illustrates the case of long-sleeved clothing. After an original image is obtained by scanning the long-sleeved clothing, the original image is pre-processed into black and white.

FIG. 5A illustrates the case of round neck long-sleeved clothing. After an original image is obtained by scanning the round neck long-sleeved clothing, the original image is pre-processed into black and white.

The shape of the clothing image may be identified using a curve function obtained through the above-described process.

After the second step S110 is completed, the third step S120 is performed to extract the features of the clothing by performing image processing on the extracted target image using the feature calculation unit 9.

The image processing process refers to the process of organizing and formatting data before training a learning model using data analysis and artificial intelligence.

Various methods are applied to the image processing process. For example, the data pre-processing process may be performed by a data collection step of checking the quality and validity of data by checking a date source, a step of searching the structure and content of the data, a step of processing missing values, outliers, and duplicate values in the data, a step of selecting data features to be used in a model and encoding categorical data, a step of dividing the data, a scaling step of normalizing or standardizing numerical data, and a step of changing data if necessary.

The image processing process is described with an example as follows.

The feature calculation unit 9 identifies clothing and calculates the features of clothing, based on the input clothing data. That is, the feature calculation unit 9 includes a first calculation module 15 that grasps and identifies the features of the clothing image on the basis of Equation 1 below, and a second calculation module 17 that calculates the features of each part constituting the clothing image calculated by the first calculation module 15 on the basis of Equation 2 below.

In the feature calculation unit 9, the identification and features of clothing may be implemented by two-dimensional or three-dimensional functions of the shape of the clothing and the pattern inside the clothing.

That is, the feature calculation unit 9 may derive a predetermined function equation to model the relationship between input data and output data for the image, and the output value may be predicted through this process.

To explain in more detail, the first calculation module 15 identifies the shape of the clothing by performing calculation on the basis of Equation 1 below.

$$R(t) = F(C_x(t), C_y(t), C_z(t), x_{anchor}, y_{anchor}, z_{anchor}) \qquad \text{[Equation 1]}$$

In Equation 1 above, $x_{anchor}$, $y_{anchor}$, $z_{anchor}$ represent the coordinates of an anchor point on the X, Y, and Z axes of each clothing. $x_{anchor}$, $y_{anchor}$, $z_{anchor}$ represents, for example, the coordinates of an edge point A in FIG. 4A. The edge point A may be determined in various methods, for example, an edge point algorithm.

Figure 4B:
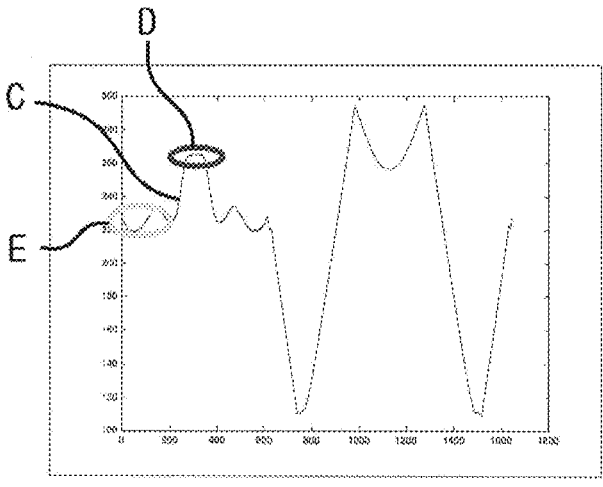
FIG. 4B is a graph showing a function curve of a short-sleeved clothing shape.
Figure 4B:
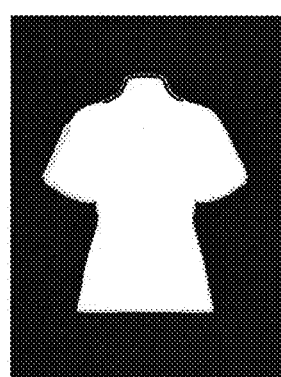
Figure 5B:
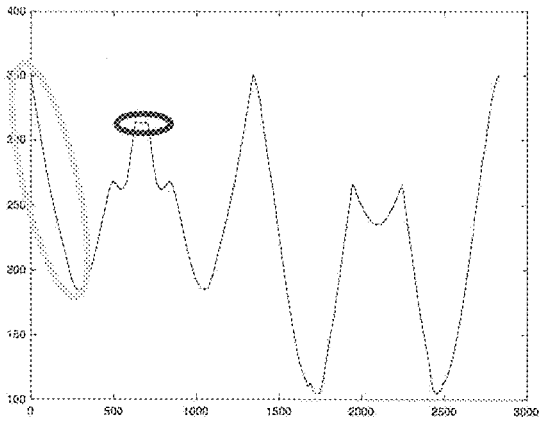
FIG. 5B is a graph showing a function curve of a long-sleeved clothing shape.
Figure 5B:
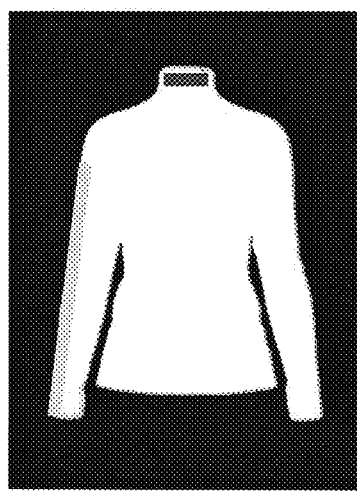
Figure 6A:
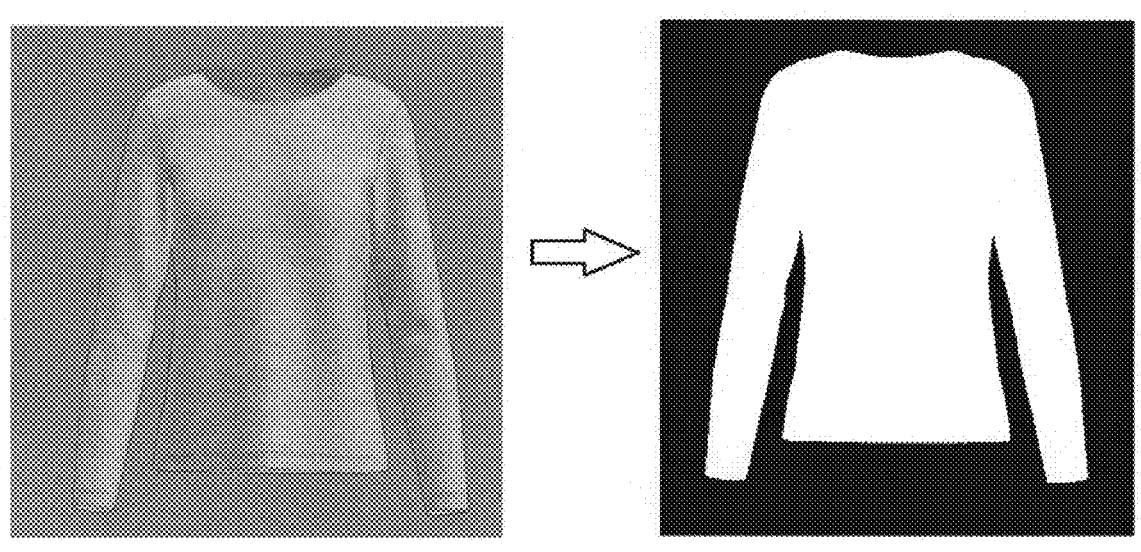
FIG. 6A is a diagram illustrating a clothing design similarity determination process for round neck long-sleeved clothing and is a diagram illustrating pre-processing of a clothing image.
Figure 6B:
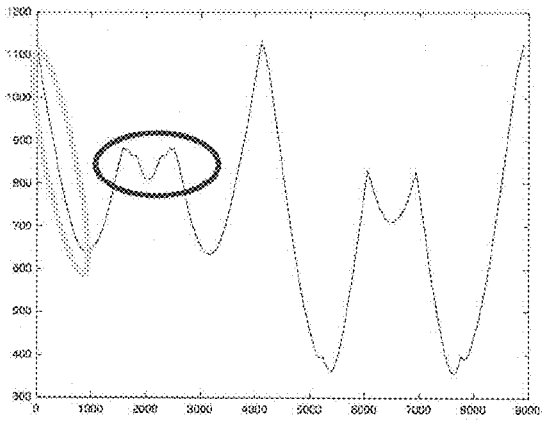
FIG. 6B is a graph showing a function curve of a round neck long-sleeved clothing shape.
Figure 6B:

$C_x(t)$, $C_y(t)$, $C_z(t)$ represent the contour functions for the shape formed by curves C obtained by connecting the X, Y, and Z axis coordinates of the respective points P spaced apart from the edge point A of the extracted image by a predetermined distance (see FIGS. 4B, 5B, and 6B).

At this time, the contour functions refers to a typical function for implementing the curve C connecting the coordinates of certain points P in a two-dimensional or three-dimensional space.

In addition, the coordinates of the edge point A and the respective points P forming the curve C may be determined in various methods For example, the coordinates of the edge point A and the respective points P forming the curve C are determined based on correlation such as the distance from the common reference point of the edge point A and the respective points P.

Of course, the correlations between the edge point A and the edge points A may also be calculated and derived as a function.

F represents a function that converts and regresses the pieces of input information into the eigenfunction of the clothing.

As such, the feature calculation unit 9 sets the coordinates for the edge point A in the clothing data and identifies the shape of the clothing by calculating the function curve C using the coordinates of the plurality of points P arranged along the exterior line of the clothing. Identification codes are assigned to pieces of clothing according to the shapes thereof, so as to identify the pieces of clothing.

On the other hand, as described above, after calculating the primary feature of the shape of the clothing on the basis of Equation 1 of the first calculation module 15, and the secondary feature of each part constituting the clothing may be calculated in more detail using Equation 2 of the second calculation module 17.

$$R_{set} = \{R_1(t), R_2(t), \dots, R_N(t)\} \qquad \text{[Equation 2]}$$
$$K_i = \{R_{idx1}(t), R_{idx2}(t), \dots, R_{idxM}(t)\},$$
$$i = 1, \dots, U$$

In Equation 2, $R_i(t)$ is an equation obtained from Equation 1, and $R_{set}$ is a combination thereof.

In other words, $R_{set}$ represents data about the shape of the clothing image calculated from the edge point A and the plurality of points P in the clothing image illustrated in FIGS. 4A, 5A, and 6A and the curve shapes of FIGS. 4B, 5B, and 6B.

$K_i$ represents the clothing feature with the i-th feature and idx1, idx2, . . . , idxM is determined through M functions from $R_{set}$.

For example, a neck part D of clothing may be represented by a K1-th function, both arms E may be represented by a K2-th function, and a torso may be represented by a K3-th function.

The total number of clothing features is U. At this time, $K_{set}$ includes U features. In other words, $K_{set}$ refers to the features of the U parts constituting the clothing, for example, the features of the neck, arms, and the torso.

At this time, a database table that maps the clothing and the equations has the following form.

|  | $R_{set}$ | $K_{set}$ |
| --- | --- | --- |
| Clothing 1 | . . . | . . . |
| . . . | . . . | . . . |
| Clothing N | . . . | . . . |

The features of the image may be identified using a curve function obtained through the above-described process.

As described above, curves for clothing image shapes are implemented, and curves for clothing of various shapes such as short sleeves, long sleeves, and round neck are shown below.

That is, as illustrated in FIG. 4B, in the case of short-sleeved clothing, curves for the short-sleeved and neck parts may be implemented on a graph.

In FIG. 5B, curves for the long sleeved and neck parts of the long-sleeved clothing may be implemented on a graph.

FIG. 6B illustrates the case of round neck long-sleeved clothing, and curves for the round neck long-sleeved part may be implemented on a graph.

Image data of the clothing is mapped with hyperparameters and parameter information derived from a regression process using a function and is stored in the database 13.

At this time, the hyperparameters are parameters that a user has to set directly when training a machine learning model. These parameters are used to control a learning process of a model and adjust an operation of an optimization algorithm.

After the third step S120 of processing data is completed, the fourth step S130 of storing highly important data is performed.

In the fifth step S140, data is retrieved from the database 13 and the similarity of clothing design is calculated using artificial intelligence.

When determining the similarity using such an artificial neural network, the degree of computation may be calculated by comparing the clothing data calculated by the feature calculation unit 9 with other clothing data to be compared using artificial intelligence.

This artificial neural network may be variously applied, and for example, may be determined by deep learning.

That is, the deep learning is a machine learning method built based on an artificial neural network (ANN) so as to enable computers to use various data to learn on their own like humans.

Using the artificial neural network, classification and clustering of clothing design data are possible. Similarity may be determined by placing several layers on data to be classified or clustered.

Figure 7:
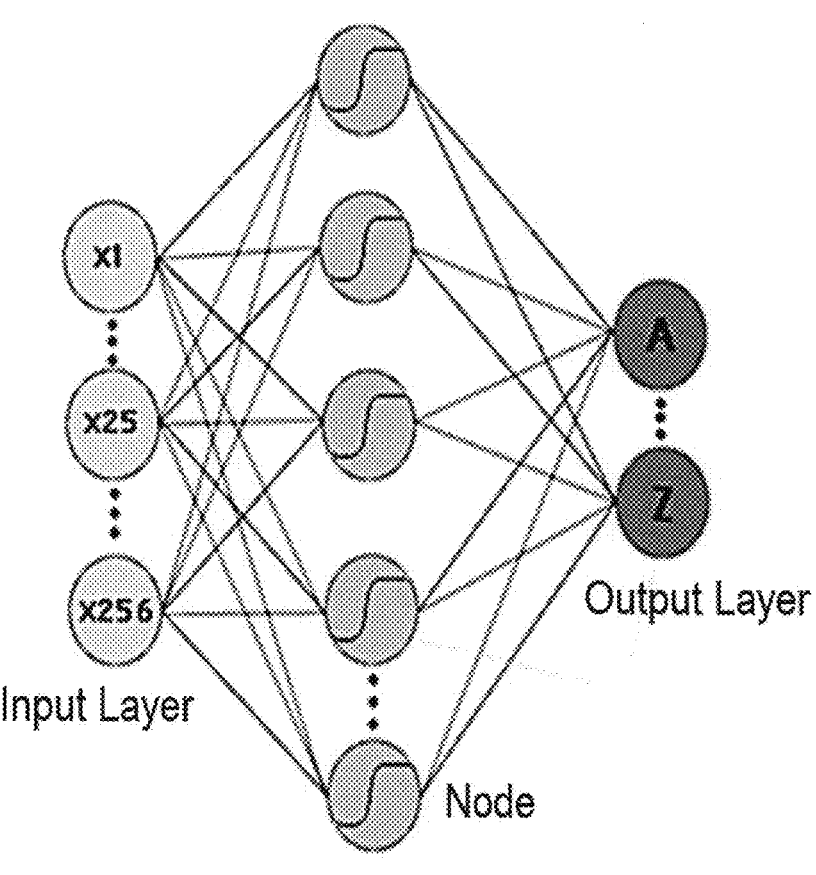
FIG. 7 is a diagram schematically illustrating a structure of an artificial neural network mounted on the management server illustrated in FIG. 1.
Figure 8:
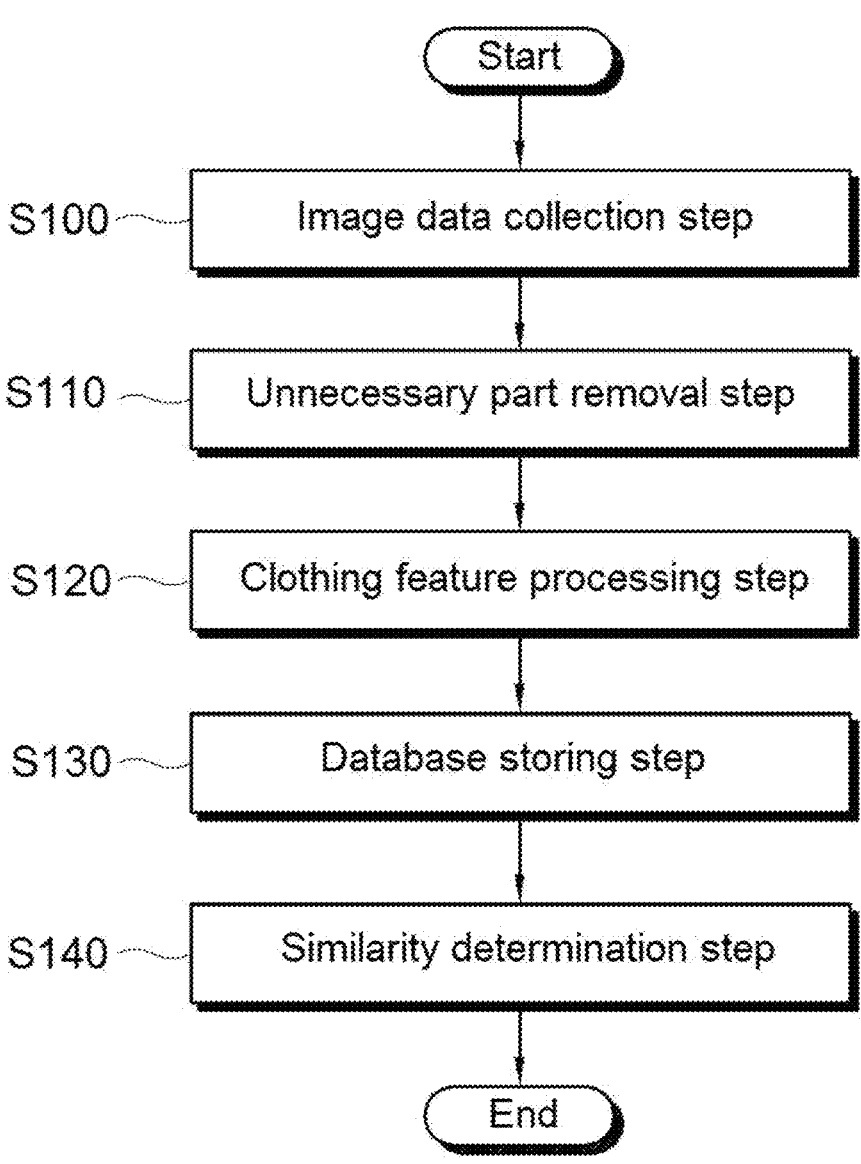
FIG. 8 is a flowchart showing a clothing design similarity determination method performed by the clothing design similarity determination system illustrated in FIG. 1.

That is, as illustrated in FIG. 7, similarity may be determined by extracting the features of clothing design using an artificial neural network and performing classification and clustering for each design by using the features as input values for another machine learning algorithm.

This artificial neural network includes a deep neural network, and the deep neural network refers to a neural network including a plurality of layers in the neural network algorithm.

In other words, since the artificial neural network includes a plurality of layers, each of the layers includes a plurality of nodes, calculation for actually classifying clothing designs occur at each node, and the calculation process is designed to mimic the process that occurs in neurons constituting a human neural network.

When determining similarity using the artificial neural network, a model for determining similarity is first trained.

In other words, a plurality of clothing data are preprocessed and learning is performed by inputting the preprocessed clothing data as training data to the artificial neural network model. For example, training data may be learned using Siamese Network, Triplet Network, etc.

Image data of the clothing for which similarity is to be determined and the clothing to be compared are input to the artificial neural network model to extract intermediate features.

The features are extracted from the clothing image using the feature extraction function from the extracted intermediate data.

Similarity between two clothing images is calculated using features.

At this time, there are various methods for calculating similarity, for example, Euclidean distance, cosine similarity, etc.

That is, similarity may be calculated based on the distance or angle between clothing images.

When the similarity exceeds a certain threshold, the two data may be determined to be similar to each other.

Hereinafter, the clothing design similarity determination method in accordance with the present disclosure may be performed by the following system.

That is, as illustrated in FIGS. 1 to 7, the clothing design similarity determination system includes the device 1 that obtains and controls clothing images, and the management server 3 that determines similarity by processing clothing design data transmitted from the device 1 through the network.

In the clothing design similarity determination system, the device 1 includes a smart device such as a digital camera, a mobile device, and a scanner that obtain mages by photographing clothing.

This device 1 may transmit and receive data to and from the management server 3 through the network such as the Internet, and may input a variety of information and commands.

When mobile devices such as smartphones are used as the device 1, clothing images may be obtained using a camera mode in a state in which users activate a relevant application on their mobile devices, and image data may be transmitted to the management server 3 by clicking another menu.

The management server 3 receives design data in conjunction with the device 1, performs pre-processing on the clothing designs, and determines similarity between the designs.

This management server 3 refers to a typical server. The management server 3 is computer hardware on which a server program is running. The management server 3 monitors and controls the entire network, such as printer control or file management, or supports connection to other networks through a mainframe or public network, sharing of software resources such as data, programs, and files, sharing of modems, faxes, and printers, and sharing of hardware resources such as other equipment.

Figure 2:
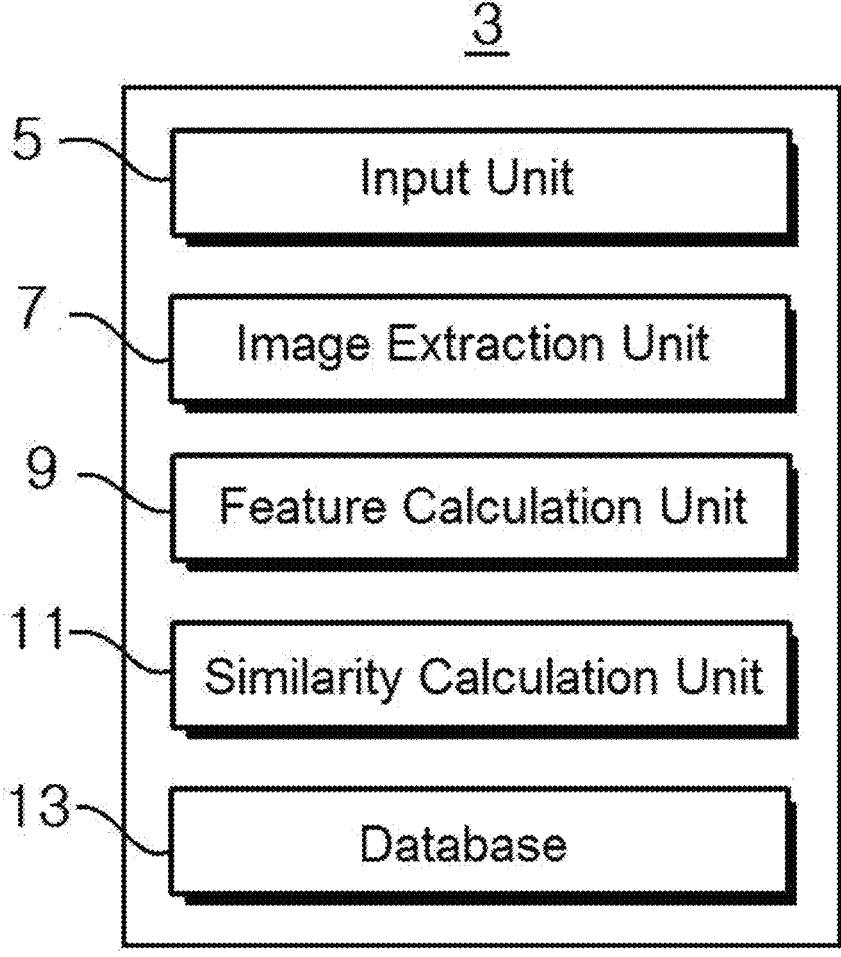
FIG. 2 is a block diagram schematically illustrating a structure of a management server illustrated in FIG. 1.
Figure 3:
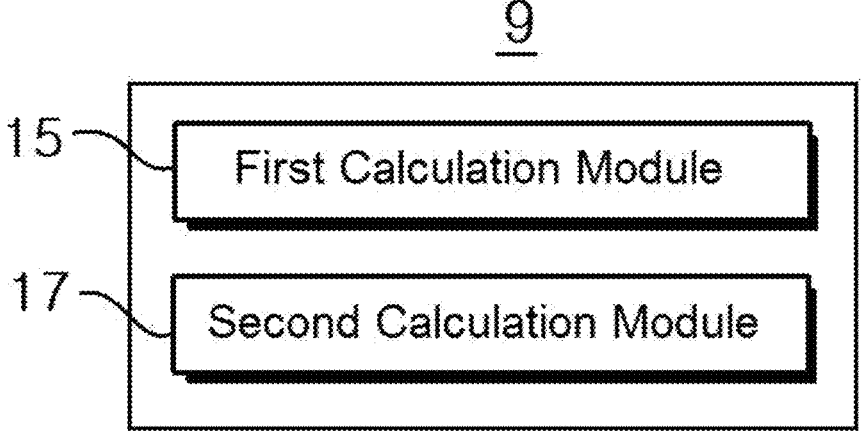
FIG. 3 is a block diagram schematically illustrating a structure of a feature calculation unit of the management server illustrated in FIG. 2.

As illustrated in FIG. 2, the management server 3 includes an input unit 5 that receives clothing image data from the device 1, an image extraction unit 7 that extracts target image data through pre-processing performed by removing unnecessary parts from the collected clothing image data, a feature calculation unit 9 that processes the extracted target image data into a curved shape using an equation to perform clothing identification and feature calculation, a similarity calculation unit 11 that calculates the similarity of the clothing data calculated in the feature calculation unit 9 to other clothing designs using artificial intelligence, and a database 13 in which the data is stored.

In the management server 3, the input unit 5 may receive clothing fashion design data transmitted from the device 1.

The image extraction unit 7 extracts the target image by removing unnecessary parts from the collected image data.

That is, the image extraction unit 7 removes unnecessary images from the collected clothing images using various algorithms.

In other words, unnecessary images may be removed from the original image by algorithms such as outlier detection, duplicate removal, quality evaluation, labeling error, and data balance maintenance.

The feature calculation unit 9 identifies clothing and calculates the features of clothing, based on the input clothing data. That is, the feature calculation unit 9 includes a first calculation module 15 that grasps and identifies the features of the clothing image on the basis of Equation 1 below, and a second calculation module 17 that calculates the features of each part constituting the clothing image calculated by the first calculation module 15 on the basis of Equation 2 below.

In the feature calculation unit 9, the first calculation module 15 identifies the shape of the clothing by performing calculation on the basis of Equation 1 below.

$$R(t) = F(C_x(t), C_y(t), C_z(t), x_{anchor}, y_{anchor}, z_{anchor}) \qquad \text{[Equation 1]}$$

In Equation 1 above, $x_{anchor}$, $y_{anchor}$, $z_{anchor}$ represent the coordinates of an anchor point on the X, Y, and Z axes of each clothing. $x_{anchor}$, $y_{anchor}$, $z_{anchor}$ represent, for example, the coordinates of an edge point A in FIG. 4A. The edge point A may be determined in various methods, for example, an edge point algorithm.

$C_x(t)$, $C_y(t)$, $C_z(t)$ represent the contour functions for the shape formed by curves C obtained by connecting the X, Y, and Z axis coordinates of the respective points P spaced apart from the edge point A of the extracted image by a predetermined distance (see FIGS. 4B, 5B, and 6B).

At this time, the contour functions refers to a typical function for implementing the curve C connecting the coordinates of certain points P in a two-dimensional or three-dimensional space.

In addition, the coordinates of the edge point A and the respective points P forming the curve C may be determined in various methods For example, the coordinates of the edge point A and the respective points P forming the curve C are determined based on correlation such as the distance from the common reference point of the edge point A and the respective points P.

Of course, the correlations between the edge point A and the edge points A may also be calculated and derived as a function.

F represents a function that converts and regresses the pieces of input information into the eigenfunction of the clothing.

As such, the feature calculation unit 9 sets the coordinates for the edge point A in the clothing data and identifies the shape of the clothing by calculating the function curve C using the coordinates of the plurality of points P arranged along the exterior line of the clothing. Identification codes are assigned to pieces of clothing according to the shapes thereof, so as to identify the pieces of clothing.

On the other hand, as described above, after calculating the primary feature of the shape of the clothing on the basis of Equation 1 of the first calculation module 15, and the secondary feature of each part constituting the clothing may be calculated in more detail using Equation 2 of the second calculation module 17.

$$R_{set} = \{R_1(t), R_2(t), \ldots, R_N(t)\} \qquad \text{[Equation 2]}$$
$$K_i = \{R_{idx1}(t), R_{idx2}(t), \ldots, R_{idxM}(t)\},$$
$$i = 1, \ldots, U$$

In Equation 2, $R_i(t)$ is an equation obtained from Equation 1, and $R_{set}$ is a combination thereof.

In other words, $R_{set}$ represents data about the shape of the clothing image calculated from the edge point A and the plurality of points P in the clothing image illustrated in FIGS. 4A, 5A, and 6A and the curve shapes of FIGS. 4B, 5B, and 6B.

$K_i$ represents the clothing feature with the i-th feature and idx1, idx2, . . . , idxM is determined through M functions from $R_{set}$.

For example, a neck part D of clothing may be represented by a K1-th function, both arms E may be represented by a K2-th function, and a torso may be represented by a K3-th function.

The total number of clothing features is U. At this time, $K_{set}$ includes U features. In other words, $K_{set}$ refers to the features of the U parts constituting the clothing, for example, the features of the neck, arms, and the torso.

The features of the image may be identified using a curve function obtained through the above-described process.

That is, as illustrated in FIGS. 4B, 5B, and 6B, curves for short-sleeved, long-sleeved, and round neck long-sleeved clothing may be implemented on a graph.

After the clothing image is processed through this process, the similarity of the clothing design is determined by the similarity determination unit on which artificial intelligence is mounted.

That is, when determining the similarity between a given piece of clothing and another piece of clothing to be compared, the similarity may be determined by implementing the images of both pieces of clothing as a curve on a graph through the process described above and then comparing the shapes of both graphs.

What is claimed is:

1. A clothing design similarity determination method comprising:
    a first step (S100) of collecting image data about clothing using a device (1);
    a second step (S110) of removing unnecessary parts from the collected image data using a pre-processing unit;
    a third step (S120) of image-processing features of the clothing by calculating an extracted target image using a feature calculation unit (9);
    a fourth step (S130) of storing the data of the first, second, and third steps (S100, S110, S120) in a database (13); and
    a fifth step (S140) of calculating similarity of clothing design using artificial intelligence,
    wherein a data processing process in the third step (S120) is performed by the feature calculation unit (9) including first and second calculation modules (15, 17), and the first calculation module (15) grasps and identifies features of a clothing image on the basis of Equation 1 below:

$$R(t) = F(C_x(t), C_y(t), C_z(t), x_{anchor}, y_{anchor}, z_{anchor}) \qquad \text{[Equation 1]}$$

wherein $x_{anchor}, y_{anchor}, z_{anchor}$: anchor points on X, Y, and Z axes of each clothing,
$C_x(t), C_y(t), C_z(t)$: contour functions in the X, Y, and Z axes, which are obtained from edges of an extracted image, and
F: a function that converts and regresses pieces of input information into an eigenfunction of the clothing.

2. The clothing design similarity determination method of claim 1, wherein, in the third step (S120), the second calculation module (17) calculates features of each part constituting the clothing image calculated by the first calculation module (15) on the basis of Equation 2 below:

$$R_{set} = \{R_1(t), R_2(t), \dots, R_N(t)\} \qquad \text{[Equation 2]}$$

$$K_i = \{R_{id \times 1}(t), R_{id \times 2}(t), \dots, R_{id \times M}(t)\},$$

-continued
$$i = 1, \dots, U$$

wherein $R_i(t)$: equation obtained from Equation 1,
$R_{set}$: a combination thereof, and
$K_i$: clothing feature with i-th feature.

3. A clothing design similarity determination system comprising:
    a device (1) configured to obtain and control clothing images; and
    a management server (3) configured to determine similarity by processing clothing design data transmitted from the device (1) through a network,
    wherein the management server (3) comprises:
    an input unit (5) configured to receive clothing image data from the device (1);
    an image extraction unit (7) configured to extract target image data through pre-processing performed by removing unnecessary parts from the collected clothing image data;
    a feature calculation unit (9) configured to calculate features of clothing using an equation from the extracted target image data and process the calculated features into a curved shape;
    a similarity calculation unit (11) configured to calculate similarity of clothing data calculated in the feature calculation unit (9) with respect to other clothing designs using artificial intelligence; and
    a database (13) in which data is stored,
    wherein the feature calculation unit (9) comprises:
    a first calculation module (15) configured to grasp and identify the features of the clothing image on the basis of Equation 1 below; and
    a second calculation module (17) configured to calculate the features of each part constituting the clothing image calculated by the first calculation module (15):

$$R(t) = F(C_x(t), C_y(t), C_z(t), x_{anchor}, y_{anchor}, z_{anchor}) \qquad \text{[Equation 1]}$$

wherein $x_{anchor}, y_{anchor}, z_{anchor}$: anchor points on X, Y, and Z axes of each clothing,
$C_x(t), C_y(t), C_z(t)$: contour functions in the X, Y, and Z axes, which are obtained from edges of an extracted image, and
F: a function that converts and regresses pieces of input information into an eigenfunction of the clothing.

4. The clothing design similarity determination system of claim 3, wherein the second calculation module (17) calculates features of each part constituting the clothing image calculated by the first calculation module (15) on the basis of Equation 2 below:

$$R_{set} = \{R_1(t), R_2(t), \dots, R_N(t)\} \qquad \text{[Equation 2]}$$

$$K_i = \{R_{id \times 1}(t), R_{id \times 2}(t), \dots, R_{id \times M}(t)\},$$

$$i = 1, \dots, U$$

wherein $R_i(t)$: equation obtained from Equation 1,
$R_{set}$: a combination thereof, and
$K_i$: clothing feature with i-th feature.

\* \* \* \* \*